(12) United States Patent
Menge

(10) Patent No.: US 11,054,530 B2
(45) Date of Patent: Jul. 6, 2021

(54) SUBSTRATE INCLUDING SCINTILLATOR MATERIALS, SYSTEM INCLUDING SUBSTRATE, AND METHOD OF USE

(71) Applicant: SAINT-GOBAIN CERAMICS & PLASTICS, INC., Worcester, MA (US)

(72) Inventor: Peter R. Menge, Novelty, OH (US)

(73) Assignee: SAINT-GOBAIN CERAMICS & PLASTICS, INC., Worcester, MA (US)

(*) Notice: Subject to any disclaimer, the term of this patent is extended or adjusted under 35 U.S.C. 154(b) by 116 days.

(21) Appl. No.: 16/196,215

(22) Filed: Nov. 20, 2018

(65) Prior Publication Data

US 2019/0162864 A1    May 30, 2019

Related U.S. Application Data

(60) Provisional application No. 62/590,404, filed on Nov. 24, 2017.

(51) Int. Cl.
*G01T 1/20* (2006.01)
*G07D 7/06* (2006.01)
(Continued)

(52) U.S. Cl.
CPC ........... *G01T 1/2006* (2013.01); *D21H 21/48* (2013.01); *G01N 21/6408* (2013.01);
(Continued)

(58) Field of Classification Search
CPC .... G01T 1/2006; G01T 1/2023; G01T 1/2008
See application file for complete search history.

(56) References Cited

U.S. PATENT DOCUMENTS 4,710,614 A    12/1987  Camus
4,879,465 A *  11/1989  Persyk ................. G01T 1/1642
                                                          250/363.02
(Continued)

FOREIGN PATENT DOCUMENTS

CN    102002365 A    4/2011
EP      2833165 A1   2/2015

OTHER PUBLICATIONS

International Search Report and Written Opinion for PCT/US2018/061934, dated Mar. 5, 2019, 13 pages.
(Continued)

*Primary Examiner* — David P Porta
*Assistant Examiner* — Djura Malevic
(74) *Attorney, Agent, or Firm* — Abel Schillinger, LLP; Robert N Young (57) ABSTRACT

A substrate can include at least two scintillator materials that are mixed at a predetermined ratio. In an embodiment, the scintillator materials can have a decay time difference of at least 50% when exposed to a same radiation source. In another embodiment, the scintillator materials can have a maximum emission wavelength difference of at least 25 nm when exposed to a same radiation source. At least one of the scintillator materials has a decay time of at most 10 μs. A system can include the substrate and a logic element configured to determine an identity represented by the substrate. A method can include generating an electronic pulse in response to the substrate being exposed to a radiation source; and analyzing the electronic pulse to determine an identity represented by the substrate.

20 Claims, 3 Drawing Sheets

(51) Int. Cl.
*G07D 7/202* (2016.01)
*G07D 7/12* (2016.01)
*G07D 7/206* (2016.01)
*G07D 7/1205* (2016.01)
*D21H 21/48* (2006.01)
*G01N 21/64* (2006.01)
*G01T 1/202* (2006.01)

(52) U.S. Cl.
CPC .......... *G01T 1/2008* (2013.01); *G01T 1/2023* (2013.01); *G07D 7/06* (2013.01); *G07D 7/12* (2013.01); *G07D 7/1205* (2017.05); *G07D 7/205* (2013.01); *G07D 7/206* (2017.05)

(56) References Cited

U.S. PATENT DOCUMENTS

| | | | | |
|---|---|---|---|---|
| 5,841,833 A * | 11/1998 | Mazess | A61B 6/032 | 378/98.9 |
| 5,864,146 A * | 1/1999 | Karellas | A61B 6/06 | 250/581 |
| 6,362,479 B1 * | 3/2002 | Andreaco | G01T 1/1644 | 250/363.01 |
| 6,392,236 B1 * | 5/2002 | Maekawa | G01T 1/2008 | 250/369 |
| 6,402,986 B1 | 6/2002 | Jones, II et al. | | |
| 6,445,765 B1 * | 9/2002 | Frank | A61B 6/032 | 378/54 |
| 6,570,160 B1 * | 5/2003 | Maekawa | G01T 1/202 | 250/367 |
| 6,683,934 B1 * | 1/2004 | Zhao | A61B 6/032 | 378/37 |
| 6,707,876 B2 * | 3/2004 | Tanigawa | A61B 6/032 | 378/19 |
| 6,749,761 B1 * | 6/2004 | Andreaco | G01T 1/2002 | 216/24 |
| 6,908,576 B2 | 6/2005 | Saito et al. | | |
| 7,129,494 B2 * | 10/2006 | Shah | C09K 11/7772 | 250/363.03 |
| 7,145,149 B2 * | 12/2006 | Cooke | C09K 11/7774 | 250/361 R |
| 7,173,247 B2 * | 2/2007 | Shah | C09K 11/7772 | 250/363.03 |
| 7,214,947 B2 * | 5/2007 | Bueno | G01T 1/2018 | 250/370.11 |
| 7,244,942 B2 * | 7/2007 | Andreaco | G01T 1/2002 | 250/367 |
| 7,504,634 B2 * | 3/2009 | Shah | C09K 11/7772 | 250/361 R |
| 7,538,330 B2 * | 5/2009 | Nomura | G01T 1/2018 | 250/367 |
| 7,547,888 B2 * | 6/2009 | Cooke | G01T 1/2023 | 250/361 R |
| 7,893,405 B2 * | 2/2011 | Nagano | G01T 1/2018 | 250/370.11 |
| 8,311,185 B2 * | 11/2012 | Seppi | H01J 35/101 | 378/98.9 |
| 8,405,035 B1 * | 3/2013 | Nagarkar | G01T 1/2008 | 250/361 R |
| 8,481,952 B2 * | 7/2013 | Menge | G01T 1/00 | 250/368 |
| 8,575,553 B1 * | 11/2013 | Shah | G21K 4/00 | 250/361 R |
| 8,614,420 B2 * | 12/2013 | Menge | G01T 1/203 | 250/362 |
| 8,674,312 B2 * | 3/2014 | Szupryczynski | G01T 1/20 | 250/366 |
| 9,250,183 B2 | 2/2016 | Smith et al. | | |
| 9,575,188 B2 * | 2/2017 | Nitta | G01T 1/2002 | |
| 10,153,222 B2 * | 12/2018 | Yu | H01L 25/03 | |
| 10,267,927 B2 * | 4/2019 | Nelson | A61B 6/4208 | |
| 10,459,094 B2 * | 10/2019 | Simanovsky | G01T 1/2018 | |
| 2002/0021003 A1 | 2/2002 | McGrew | | |
| 2002/0070343 A1 | 6/2002 | Hoffman | | |
| 2003/0030003 A1 * | 2/2003 | Maekawa | G01T 1/202 | 250/367 |
| 2004/0159792 A1 * | 8/2004 | Andreaco | G01T 1/1644 | 250/363.03 |
| 2004/0233465 A1 | 11/2004 | Coyle et al. | | |
| 2005/0013463 A1 | 1/2005 | Reed et al. | | |
| 2005/0016950 A1 * | 1/2005 | Andreaco | G01T 1/202 | 216/24 |
| 2005/0042428 A1 | 2/2005 | Dean | | |
| 2005/0082491 A1 * | 4/2005 | Seppi | A61B 6/032 | 250/370.11 |
| 2005/0084060 A1 * | 4/2005 | Seppi | A61B 6/032 | 378/5 |
| 2005/0084073 A1 * | 4/2005 | Seppi | A61B 6/032 | 378/156 |
| 2005/0104002 A1 * | 5/2005 | Shah | C09K 11/7772 | 250/363.03 |
| 2005/0178841 A1 | 8/2005 | Jones, II et al. | | |
| 2006/0263521 A1 | 1/2006 | Sato et al. | | |
| 2006/0054863 A1 * | 3/2006 | Dai | C09K 11/02 | 252/301.4 R |
| 2006/0124854 A1 * | 6/2006 | Shah | G01T 1/1644 | 250/363.04 |
| 2006/0237654 A1 * | 10/2006 | Srivastava | C09K 11/7704 | 250/370.11 |
| 2008/0083877 A1 * | 4/2008 | Nomura | G01T 1/2018 | 250/370.11 |
| 2008/0110995 A1 | 5/2008 | Iftime et al. | | |
| 2008/0128626 A1 * | 6/2008 | Rousso | A61B 5/415 | 250/362 |
| 2008/0169753 A1 | 7/2008 | Skipor et al. | | |
| 2008/0237470 A1 * | 10/2008 | Loureiro | G01T 1/20 | 250/361 R |
| 2008/0311380 A1 * | 12/2008 | Agrawal | C08L 63/00 | 428/323 |
| 2009/0140158 A1 * | 6/2009 | Clothier | C08K 3/01 | 250/390.11 |
| 2009/0200479 A1 * | 8/2009 | Nomura | G01T 1/2018 | 250/370.11 |
| 2010/0006762 A1 | 1/2010 | Yoshida et al. | | |
| 2010/0062194 A1 | 3/2010 | Sun | | |
| 2010/0102250 A1 | 4/2010 | Li et al. | | |
| 2010/0155610 A1 * | 6/2010 | Menge | G01T 1/00 | 250/368 |
| 2010/0270462 A1 * | 10/2010 | Nelson | G01T 1/202 | 250/252.1 |
| 2011/0133094 A1 * | 6/2011 | Seppi | A61B 6/4233 | 250/367 |
| 2011/0192979 A1 * | 8/2011 | Cahill | G01T 1/202 | 250/362 |
| 2011/0192981 A1 * | 8/2011 | Menge | G01T 1/203 | 250/362 |
| 2012/0056104 A1 * | 3/2012 | Perna | G01T 1/2002 | 250/486.1 |
| 2013/0032722 A1 * | 2/2013 | Szupryczynski | G01T 1/20 | 250/366 |
| 2013/0048864 A1 * | 2/2013 | Nakatsugawa | H01L 27/14618 | 250/366 |
| 2013/0126850 A1 * | 5/2013 | Iwakiri | H01L 51/42 | 257/40 |
| 2013/0193332 A1 * | 8/2013 | Menge | H01L 31/115 | 250/368 |
| 2014/0166933 A1 * | 6/2014 | Shah | G21K 4/00 | 252/301.4 H |
| 2015/0059963 A1 * | 3/2015 | Nitta | B32B 38/0012 | 156/154 |
| 2017/0327739 A1 * | 11/2017 | Shah | G21K 4/00 | |
| 2018/0171224 A1 * | 6/2018 | Shah | G21K 4/00 | |
| 2018/0172847 A1 * | 6/2018 | Nelson | A61B 6/035 | |

(56) References Cited

U.S. PATENT DOCUMENTS

2018/0172848 A1* 6/2018 Nelson .................. A61B 6/035
2018/0172849 A1* 6/2018 Nelson ................. A61B 6/4258

OTHER PUBLICATIONS

Lakowicz, Joseph R., "Fluorophores," Principles of Fluorescence Spectroscopy, 3rd ed., 2006, pp. 63-95.
"Products—D-I-D System," West Pharmaceutical Services, 1 page, www.westpharma.com/products/did.asp, page as archived Apr. 10, 2005 accessed via web.archive.org.
"BD Living Colors Fluorescent Proteins," BD Biosciences, 2 pages, www.bdbiosciences.com/clontech/gfp/index.shtml, page as archived Feb. 6, 2006 accessed via web.archive.org.
Coyle, William, "Anti-Counterfeiting Drug Initiative: Fluorescent Materials," 2003, 4 pages.
"IR/UV Phosphors," Phosphor Technology Ltd, 2 pages, http://www.phosphor-technology.com/ir-uv-phosphors/, accessed Jan. 4, 2019.
Kshirsagar et al., "Formation of Photo-Luminescent Patterns on Paper Using Nanocrystalline Quantum Dot Ink and Mist Deposition," Journal of Solid State Science Technology, 2013, R89-R90, vol. 2, Iss. 5, The Electrochemical Society ((abstract only)).
"Time-resolved luminescence of security inks from the UV to NIR," Horiba Scientific, 2 pages, accessed Oct. 24, 2012.

* cited by examiner

SUBSTRATE INCLUDING SCINTILLATOR MATERIALS, SYSTEM INCLUDING SUBSTRATE, AND METHOD OF USE

CROSS-REFERENCE TO RELATED APPLICATION(S)

This application claims priority under 35 U.S.C. § 119(e) to U.S. Patent Application No. 62/590,404, entitled "SUBSTRATE INCLUDING SCINTILLATOR MATERIALS, SYSTEM INCLUDING SUBSTRATE, AND METHOD OF USE," by Peter R. Menge, filed Nov. 24, 2017, which is assigned to the current assignee hereof and incorporated herein by reference in its entirety.

FIELD OF THE DISCLOSURE

The application relates to a substrate including scintillator materials, systems including the substrate, and methods of utilizing the substrate or systems in applications such as authentication, identification and anti-counterfeiting.

BACKGROUND

Many valuable items such as paper currency, watches, and jewelry contain anti-counterfeiting labels. Authentication of products, such as pharmaceutical, and documents is critical for industries to reduce loss in revenues. Anti-counterfeiting labels should be easy to read, but difficult to replicate. As counterfeiters become more sophisticated, there is a continuous need to change and update anti-counterfeiting modalities.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

Embodiments herein relate to a substrate including a composition including a first and second scintillator material that is different from one another. The substrate can be incorporated into or attached to an object, such as a valuable item, a document, a liquid, and paper currency, to allow identity verification based on the composition. The scintillator materials can be present in the composition in a predetermined ratio such that the ratio can be specifically designed to allow the object to have a unique tag for identity verification.

Other embodiments relate to a system that is configured to determine the identity represented by the substrate. Additional embodiments relate to methods of determining the identity of an object tagged by the substrate. When exposed to a radiation source, the substrate can emit scintillation lights, which can be received by a suitable photosensor and converted to a unique electrical signal corresponding to the composition of the substrate. The system can include a logic element that is configured to analyze the electrical signal and verify the identity based on information carried by the electronic signal. The system is capable of producing a light pulse and subsequent electronic signature that is unique to the substrate that can be attached to or part of the object. Furthermore, due to the complex nature of the composition and equipment and knowledge required for authentication, it will be difficult for a counterfeiter to reproduce the substrate disclosed herein.

According to an embodiment, the substrate can include a composition including at least two scintillator materials. The scintillator materials can be different from one another. The scintillator materials can include an organic material, an inorganic material, or any combination thereof. An inorganic material can include a crystalline material, such as, a monocrystalline material, a polycrystalline material, or a powder. In some applications, a monocrystalline material may be more desirable, as a monocrystalline material tends to have higher light output compared to a polycrystalline material having the same composition. In other applications, inorganic scintillator materials known in the art can be suitable. In a particular embodiment, the crystalline material may be in the form of nanoparticles having an average particle size of at most 400 nm. For instance the average particle size can be at least 10 nm and at most 400 nm, or at least 25 nm and at most 320 nm, or at least 40 nm and at most 250 nm.

According to an embodiment, at least one of the scintillator materials can include an organic material. The organic material can include a polymer, a small molecule, an organosilicon compound, an organo-metallic compound, a chelate, a triplet harvesting organic compound, or any combination thereof. Exemplary suitable small molecules can include p-terphenyl ($C_{18}H_{14}$), 2,5-diphenyloxazole (PPO, 1,1,4,4,-tetraphenylbutadiene (TBP, $C_{28}H_{22}$), 1,2,4-trimethyl benzene ($C_9H_{12}$), dimethyl stilbene (DPS, $C_{26}H_{18}$), bis-MSB ($C_{24}H_{22}$), dimethyl POPOP ($C_{26}H_{20}N_2O$), K27 ($C_{26}H_{14}O_6N_6S_2Ru$), also known as Ru(L2)H$_2$dcbpy(NCS)$_2$, or tris [1-phenylisoquinolinato] iridum (III) ($C_{15}NIrH_{10}$), or any combination thereof. An exemplary organosilicon compound can include NOL-8® and NOL-32® (available from LumminoTech LLC). In a particular embodiment, at least one of the scintillator materials can include an organosilicon compound. In another particular embodiment, each of the scintillator materials can be an organic material. For instance, one can include an organosilicon compound, and the other can include a small molecule. In another embodiment, the scintillator materials are different fluor molecules.

According to an embodiment, the scintillator materials may not be sensitive to visible light such that when the substrate is exposed to visible light, the scintillator materials may not scintillate. According to another embodiment, the scintillator materials can be sensitive to the same radiation source, such as a gamma radiation, a neutron, an x-ray, an ultraviolet light, an infrared light, or any combination thereof. In a particular embodiment, the scintillator materials can be sensitive to an ultraviolet light. In another particular embodiment, the scintillator materials can be sensitive to an infrared light. In still another embodiment, at least one of the scintillator materials can scintillate when exposed to visible light. According to a further embodiment, the scintillator materials can emit visible light, ultraviolet light, infrared light, or any combination thereof. In a particular embodiment, the scintillator materials can emit visible lights. In another particular embodiment, the scintillator materials can emit ultraviolet lights.

According to an embodiment, the scintillator materials can have a different waveform characteristic, such as a rise time, a decay time, a maximum light emission, or any combination thereof, when exposed to the same radiation source. In particular embodiment, maximum emission wavelengths of the scintillator materials can be different from one another when exposed to the same radiation source, such as ultraviolet lights. In a further embodiment, the difference of the maximum emission wavelength between any two scintillator materials can be at least 25 nm. Such minimum difference can improve accuracy of identity verification. In another embodiment, the maximum emission wavelength difference can be higher, such as at least 55 nm different, at least 70 nm different, or at least 100 nm different. In still another embodiment, the difference of the maximum emission wavelength may be at most 350 nm, which may help to ease detection of scintillation lights as scintillation lights can be detected by the photosensor.

In a further embodiment, the decay times of the scintillator materials can be different from one another. Particularly, the decay time difference between any two scintillator materials can be at least 50% relative to the smaller value of the decay times. Such minimum difference can allow pulse shape discrimination to be used with higher accuracy. Further improved accuracy can be achieved with increased decay time differences, such as at least 65% different, at least 80% different, at least 150% different. In a further embodiment, the decay times can differ by at least 3 orders of magnitude. In an exemplary application, the substrate can include a scintillator material having a decay time of sub-nanosecond and another having a decay time of several microseconds. According to a particular embodiment, the scintillator materials can have different decay times and different maximum emission wavelengths, and the differences can be as noted herein.

According to an embodiment, at least one of the scintillator materials can have a decay time of at most 10 μs, such as at most 7 μs, at most 4 μs, at most 1 μs, at most 0.1 μs, at most 10 ns, at most 1 ns, or even at most 0.8 ns, when exposed to a desired radiation source. In another embodiment, the decay time of each of the scintillator materials can be greater than 0 second, at least 1 ps, at least 10 ps, at least 50 ps, or at least 0.1 ns. Moreover, the decay time of each of the scintillator materials can be within a range including any of the minimum and maximum values disclosed herein, such as within a range of greater than 0 second and at most 10 μs. In a particular embodiment, each scintillator material can have a decay time of greater than 0 second and at most 4 μs, greater than 0 second and at most 1 μs, or greater than 0 second and at most 0.1 μs. In some applications, the scintillator materials can have the previously described decay times when an ultraviolet light is used as the radiation source. Having a relatively fast decay time (e.g., at most 10 μs) can help to improve accuracy of pulse shape discrimination. For the purpose of illustration, Table 1 includes decay times of some exemplary scintillator materials to aid understanding of the instant disclosure.

| Fluor common name | Fluor chemical name and formula | decay time (ns) |
|---|---|---|
| PTP | p-terphenyl, $C_{18}H_{14}$ | Up to 1 |
| PPO | 2,5-diphenyloxazole, $C_{15}H_{11}NO$ | Up to 2 |
| TBP | 1,1,4,4-tetraphenylbutadiene, $C_{28}H_{22}$ | Up to 10 |
| Ir(quin)$_3$ | tris[1-phenylisoquinolinato] iridium(III), $C_{15}NIrH_{10}$ | Up to 1000 |

Figure 1:
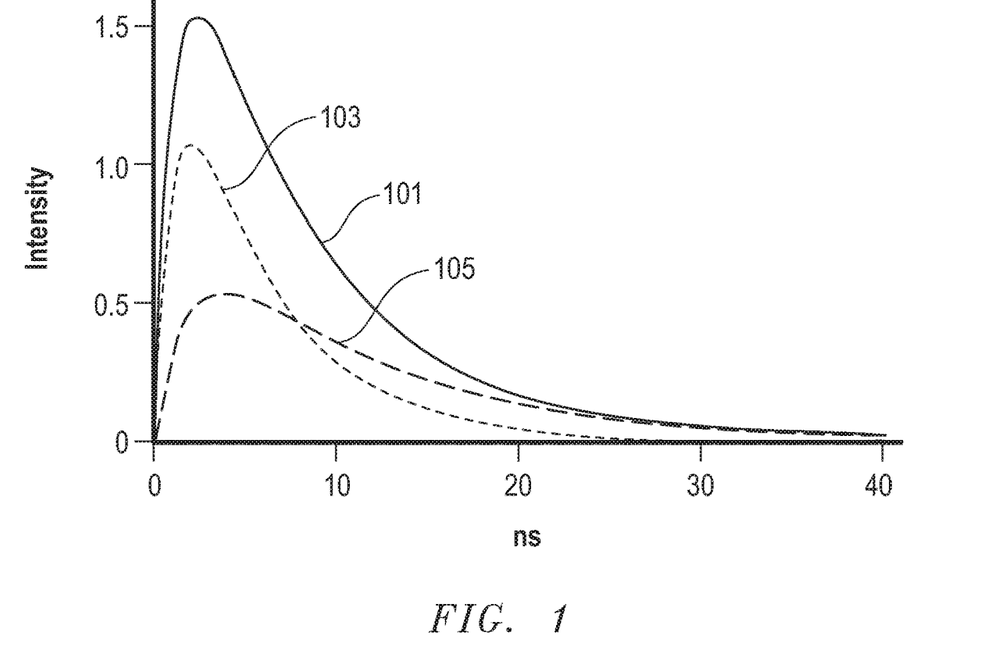
FIG. 1 includes a graph of an exemplary emission waveform in accordance with an embodiment.

According to an embodiment, the scintillator materials can be present in the substrate in a predetermined ratio. A predetermined ratio can correspond to a scintillation light emission spectrum, which can change as the predetermined ratio changes. According to another embodiment, the ratio can be customized to meet the desirability that a unique signature (emission waveform) can be efficiently provided to an object. FIG. 1 includes a graph of an emission waveform of a combination of two scintillator materials mixed in a certain ratio. The y-axis is intensity of the signal, and x-axis is the time duration of the signal. As illustrated, the peak 101 represents the electronic signal generated based on a scintillation pulse received by a photosensor. Peaks 103 and 105 correspond to separate scintillation pulses generated by the two scintillator materials, respectively. The peaks of the individual scintillator materials result from processing and analyzing the electronic pulse, which is later described in details in this disclosure. As illustrated, the scintillator materials have different decay times and emission intensity. One of ordinary skill in the art would further understand that as the predetermined ratio between the scintillator materials changes, the peak 101 shifts and demonstrates a different intensity and rise and decay characteristics.

According to an embodiment, a scintillator material can be present in the substrate in an amount that can allow effective detection of scintillation lights emitted by the scintillator material. In a further embodiment, a scintillator material can be present in an amount that can facilitate generation of a scintillation light emission waveform that would have been different when the scintillator material had been absent. For instance, a scintillator material can be at least 2 wt % for the total weight of the scintillator materials present in the substrate, such as at least 5 wt %, at least 13 wt %, at least 19 wt %, at least 26 wt %, or at least 34 wt %. In another instance, a scintillator material can be present in an amount of at most 98 wt % for the total weight of the scintillator materials present in the substrate, such as at most 85 wt %, at most 78 wt %, at most 63 wt %, or at most 52 wt %. Moreover, a scintillator material can be present in a range including any of the minimum and maximum percentages noted herein, such as in a range of 2 wt % to 98 wt %, or in a range of 19 wt % to 78 wt %.

According to a further embodiment, the scintillator materials can have a concentration of the total weight of the scintillator materials relative to the weight of the substrate. In an aspect, the concentration can allow effective detection of scintillation when the substrate is exposed to a desirable radiation source. In another aspect, the scintillator materials can have a concentration of at least 0.5%, such as at least 2%, at least 5%, at least 12%, or at least 20%. In still another aspect, the total concentration can be at most 51%, such as at most 43%, at most 37%, at most 31%, or at most 24%. Moreover, the concentration of the scintillator materials can be in a range including any of the minimum and maximum percentages noted herein, such as from 0.5% to 51%.

In an embodiment, the scintillator materials can be doped into the substrate. In another embodiment, the scintillator materials can be mixed with an ink carrier such that the substrate is imprinted with the scintillator materials. In a further embodiment, the substrate can be in the form that can be relatively easily embedded in or attached to an object. In another embodiment, the substrate can be a plastic film, a fiber, a thread, an ink, or any combination thereof. In still another embodiment, the substrate can be sewn into or deposited on an object. In yet another embodiment, the object can include currency, medicine, clothing, a fabric, a bag, a purse, liquor, a watch, a tobacco product, medical equipment, or food.

According to a further embodiment, a system can include the substrate including scintillator materials. In another embodiment, the system can include a photosensor that can receive and convert a scintillation light to an electrical signal. An exemplary photosensor can include a photomultiplier tube, semiconductor-based photomultiplier (e.g., a silicon-based photomultiplier), an avalanche photodiode, hybrid photosensors, a diffraction grating or a combination thereof. As used herein, a semiconductor-based photomultiplier in intended to mean a photomultiplier that includes a plurality of photodiodes, wherein each of the photodiodes have a cell size less than 1 mm$^2$, and the photodiodes are operated in Geiger mode. In practice, the semiconductor-based photomultiplier can include over a thousand of photodiodes, wherein each photodiode has a cell size in a range of 10 microns to 100 microns and a fixed gain. The output of the semiconductor-based photomultiplier is the sum signal of all Geiger mode photodiodes. The semiconductor-based photomultiplier can include silicon photomultiplier (SiPM) or a photomultiplier based on another semiconductor material. An avalanche photodiode has a larger size, such as a light-receiving area of at least 1 mm$^2$ and is operated in a linear mode. For a given combination of the scintillator materials, a photosensor sensitive to the wavelengths of the scintillation lights can be selected. For instance, for scintillator materials that emit lights below 350 nm, photosensors that are sensitive to an ultraviolet light, such as photomultiplier tubes and ultraviolet light sensitive silicon photomultipliers may be used in the system.

Figure 2:
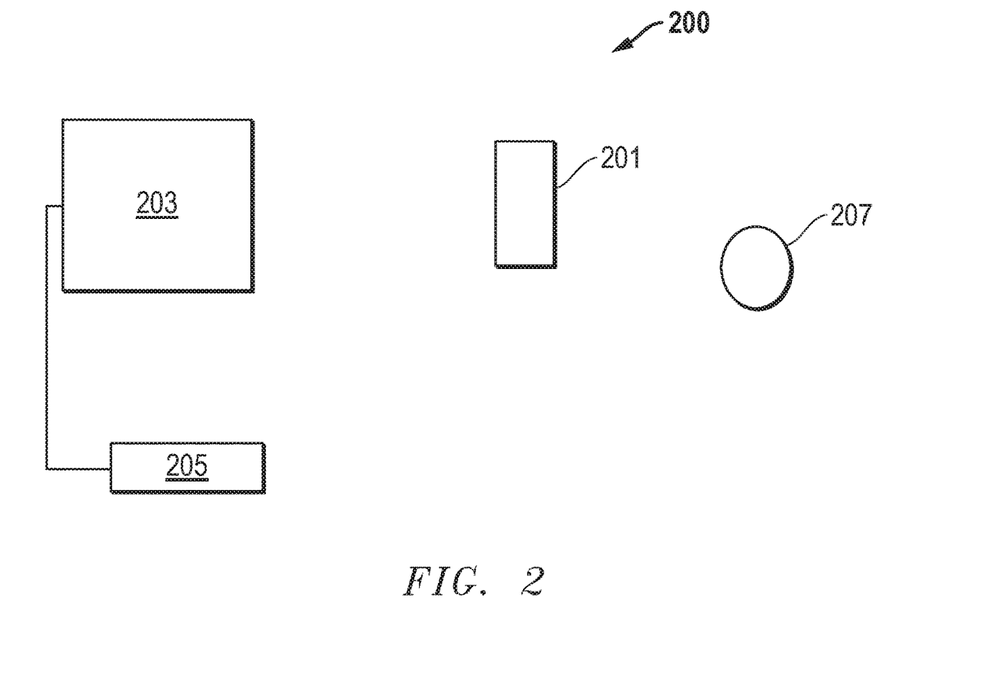
FIG. 2 includes an illustration of an exemplary system in accordance with an embodiment.

According to a further embodiment, the system can include an electronic module. FIG. 2 includes an illustration of an exemplary, non-limiting embodiment of a system 200. The system 200 includes a substrate 201, a photosensor 203, and an electronic module 205. The electronic module 205 can be coupled to the photosensor 203. The electronic pulses can be shaped, digitized, analyzed, or any combination thereof by the electronics module 205 to provide information related to verification of identity represented by the substrate. In an embodiment, the electronics module can include an amplifier, a pre-amplifier, a discriminator, an analog-to-digital signal converter, a pulse shape analyzer or discriminator, another electronic component, or any combination thereof.

Figure 3:
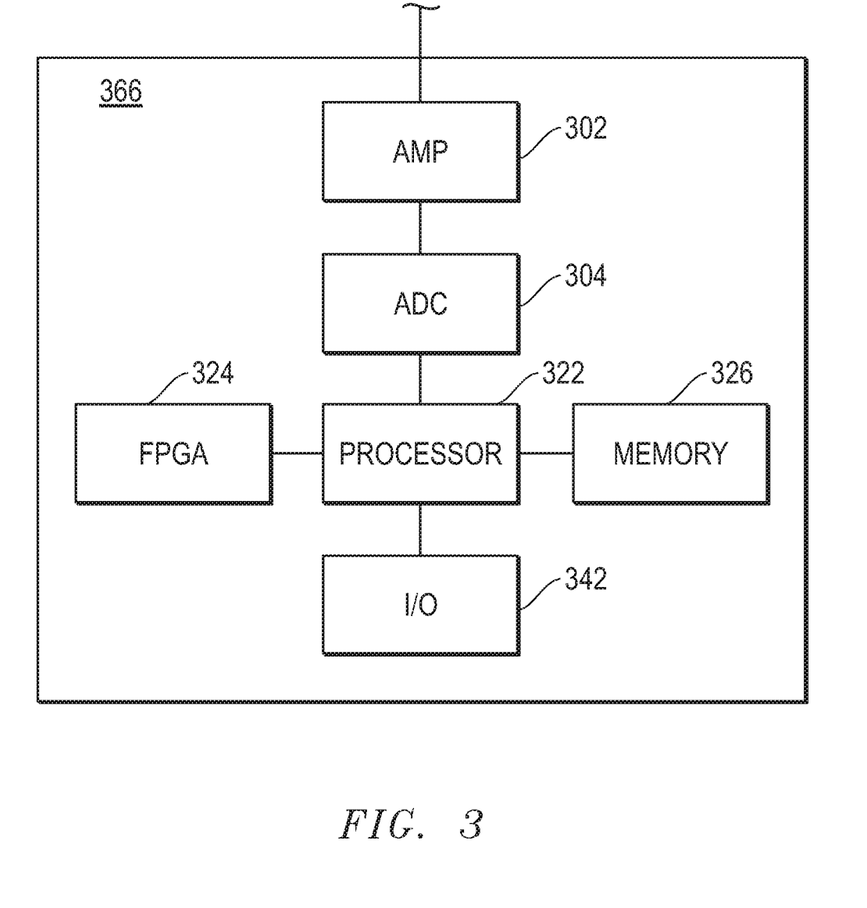
FIG. 3 includes an illustration of an exemplary electronic module in accordance with an embodiment.

FIG. 3 includes an illustration of an exemplary, non-limiting embodiment of an electronic module 300. As illustrated, an amplifier 302 is coupled to an analog-to-digital converter 304, which is coupled to a processor 322. In an embodiment, the amplifier 302 can be a high fidelity amplifier. The processor 322 is coupled to a programmable/reprogrammable processing module ("PRPM"), such as a field programmable gate array ("FPGA") 324 or application-specific integrated circuit ("ASIC"), a memory 326, and an input/output ("I/O") module 342. The couplings may be unidirectional or bidirectional. The functions provided by the components are discussed in more detail below. In another embodiment, more, fewer, or different components can be used in the electronic module 300. For example, functions provided by the FPGA 324 may be performed by the processor 322, and thus, the FPGA 324 is not required. The FPGA 324 can act on information faster than the processor 322.

According to a particular embodiment, the system can include a logic element. Referring to FIG. 3, a logic element can include the processor 322, the FPGA 324, ASIC, another suitable component configured to perform logic or computational operation, or any combination thereof. In a more particular embodiment, the logic element can be configured to determine an identity represented by the substrate.

During operation, an electronic pulse from the photosensor 203 can be received at the electronic module 205, the electronic pulse can be amplified by the amplifier 302, and the amplified electronic pulse can be converted to a digital pulse by the analog-to-digital converter 304. The digital pulse can be received by the processor 322. The digital pulse can be processed by the processor 322, sent from the processor 322 to the FPGA 324, to the memory 326, or to the I/O module 342. In an embodiment, the digital pulse can be replicated by the analog-to-digital converter 304, the processor 322, or the FPGA 324 such that different analysis can be performed on the electronic pulse.

Known information related to the scintillator materials, such as emission characteristics, can be stored in the memory 326 and retrieved by the processor 322. The processor 322 may receive such information or additional information from another device within the system. When the digital pulse is received by the processor 322, the processor 322 can request scintillator material information from the memory 326 or from other devices, if the processor 322 does not already have such information. The digital pulse and scintillator material information can be sent from the processor 322 to the FPGA 324.

Before the FPGA 324 is used in the system, information is programmed into the FPGA 324. Such information can include different pulse processing techniques, such as a value-at-time ratio, least-squares fits, Fourier transforms, or any combination thereof, to be used to analyze the digital signals received by the FPGA. Value-at-time ratio can find the amplitude of the waveform 101 at one or more particular points in time, such as at 10 and 50 ns, the ratio(s) of which can be computed. The substrate has a unique ratio or series of ratios. A least-squares fit can match the waveform 101 to a series of expressions, such as $\Sigma_{i=1}^{n} a_i [\text{Exp}(-t/b_i) - \text{Exp}(-t/c_i)]$, where n is the number of different scintillators in the substrate. The sequence of coefficients (b1, b2, b3, and so on) and (c1, c2, c3, and so on) can be unique to the substrate. A Fourier transform (FT) of a waveform 101 can be computed. The ratio of the FT amplitudes of the lowest frequency mode to one or more higher modes can be calculated. The sequence of ratios can be unique to the substrate. Alternatively, the amplitude of the lowest frequency mode can be divided by the integral of the FT over all frequencies. This is called finding the fraction of energy in the lowest mode. If needed or desired, pulse shape discrimination parameters corresponding electronic pulses may be programmed into the FGPA 324. The electronic pulses may be actual or simulated pulses that can be used for comparison. For example, the electronic pulses can include known pulses for individual scintillator materials, known pulses corresponding to the scintillator materials mixed at different ratios, or both. In another instance, the electrical pulses can include information of decay times, rise times, maximum emission wavelengths, or any combination thereof. Such electronic pulses can be used for comparison or confirmation of an electronic pulse that is subsequently received when the system 200 is used in identity verification applications. Based on the comparison, the identity represented by the substrate can be verified. Some or all of the functions described with respect to the FPGA 324 may be performed by the processor 322, and therefore, the FPGA 324 is not required in all embodiments. Further, the FPGA 324, the memory 326, the I/O module 342, or any combination thereof may be within the same integrated circuit, such as the processor 322.

According to a further embodiment, the system can include a radiation source, such as the radiation source 207 illustrated in FIG. 2. The radiation source can emit radiation that can excite the scintillator materials. Exemplary radiation source can include a gamma ray, a neutron, x-ray light, ultraviolet light, infrared light, or any combination thereof. In some applications, an ultraviolet light may be desirable, and for instance, a handheld ultraviolet light lamp or a device having the similar function may be used as the radiation source. In other applications, an infrared light emitting device may be used. In a particular embodiment, the radiation source can emit radiation having a fast pulse, such as a fast pulsed ultraviolet light. For instance, the pulse time of the radiation can be at most 50% of a decay time of a scintillator material. Particularly, the pulse time can be at most 50% of the average of the decay times of the scintillator materials, or even more particularly, the pulse time can be at most 50% of the smallest decay time of the scintillator materials. Having a fast pulsed radiation source can help to improve accuracy for discriminating decay times, particularly, fast decay times noted herein.

In another instance, the system can include a radiation source giving off radiation having a pulse time of at most 5 µs, at most 2 µs, at most 0.5 µs, at most 0.2 µs, at most 5 ns, or even at most 0.4 ns. In still another embodiment, the pulse time of the radiation may be at least 100 ps, such as 200 ps or at least 400 ps. Moreover, the pulse time of the radiation source can be in a range including any of the minimum and maximum values noted herein. In a particular embodiment, the system can include an ultraviolet light radiation source having the pulse time noted herein.

In an embodiment, visual verification of the identity can be performed in addition to pulse signal analysis. In an aspect, at least one of the scintillator materials can emit visible light (e.g., in a wavelength from 390 nm to 700 nm) to allow visual verification. For example, the identity can be confirmed when a particular portion of the object or the substrate is illuminated. In a further aspect, scintillation light may form a predetermined pattern, and the identity may be verified when the pattern is visually identified. The pattern can be customized to suit different applications such as counting the number of verified objects or identifying the date and origin of verified objects. An exemplary pattern can include a strip, a geometric shape, such as, triangle, rectangle, circle, and the like, a logo, a predetermined irregular shape, or any combination thereof. Another example of the pattern can include a particular color, and accordingly, visual verification can include identifying the portion illuminated in a predetermined color. Scintillator materials can be selected such that scintillation light can have a suitable color to allow the pattern to be identified and distinguished over the background, such as the substrate and object. In some applications, lighting of the environment where visual verification is likely to take place may be considered for determination of the pattern. An exemplary color of scintillation light can include green having a wavelength from 520 nm to 560 nm, red from 635 nm to 700 nm, or blue from 450 nm to 490 nm. In another instance, the scintillator materials can emit visible light having different wavelengths, resulting in illumination in a secondary color, such as yellow, magenta, cyan, or the like. In a further aspect, the radiation source can include visible light.

In another aspect, a wavelength shifting fiber can be included in the substrate to convert invisible scintillation light to visible light to allow visual verification. In a further aspect, a detection device can be used to convert invisible scintillation light to visible light. For instance, for a scintillator material emitting in near ultra violet light, a thin sheet of a standard clear plastic scintillator can be placed over the substrate to allow visualization of scintillation light, as the plastic scintillator can convert the near ultra violet light to visible blue light. In another embodiment, visual verification may be sufficient to determine the identity represented by the substrate for the time being, and pulse signal analysis may be performed at a later time or not performed.

An exemplary method of using the system is described in more detail below. The method is to illustrate a particular method of use. After reading this specification, skilled artisans will understand that many other applications exist and that the teachings can be used as described or with some changes.

Figure 4:
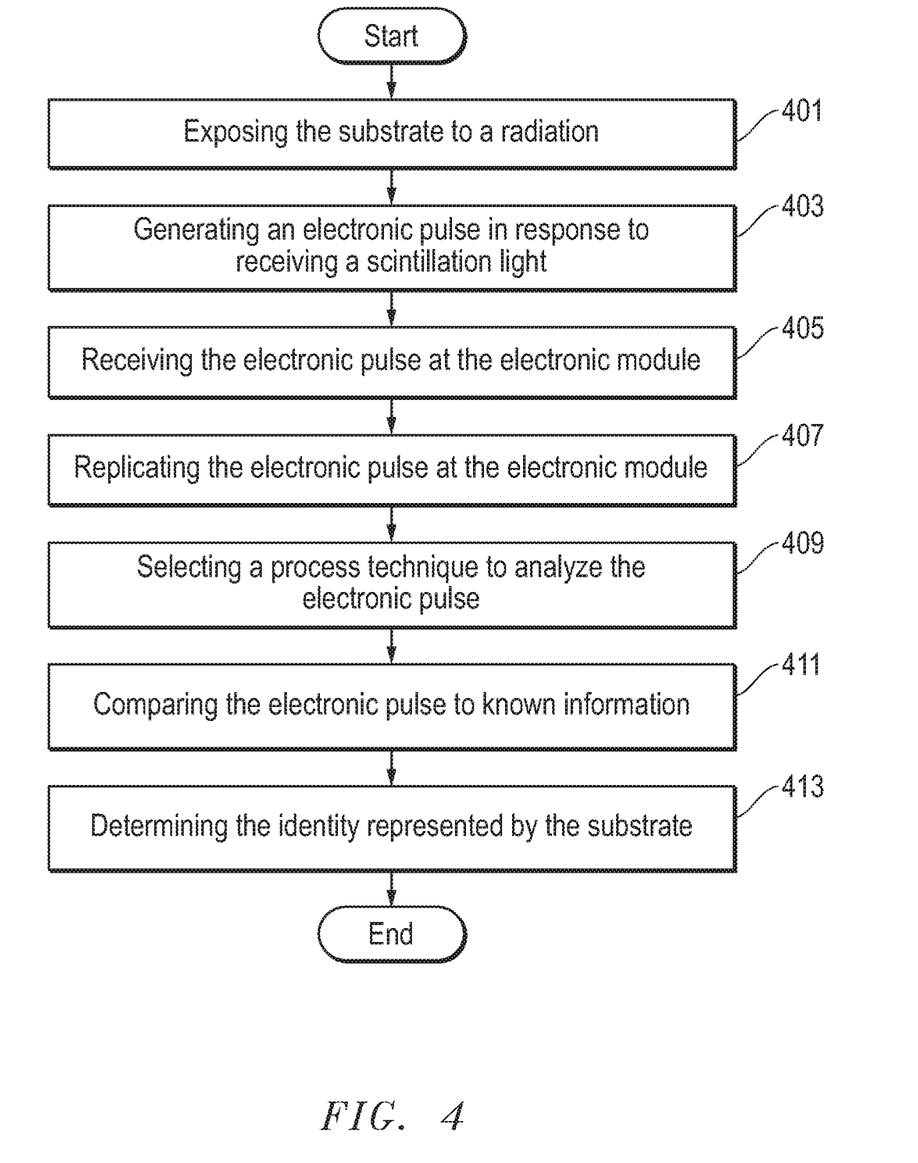
FIG. 4 includes an illustration of an exemplary method in accordance with an embodiment.

The method can start with exposing the substrate to a radiation, at block 401 of FIG. 4. For instance, the radiation source 207 can be brought closer to the substrate 201. The radiation can be any of those described previously, such as an ultraviolet light. The method can further include capturing radiation within the scintillator materials in the substrate 201 and emitting scintillation light from the scintillator materials in response to capturing the radiation. The method can include generating an electronic pulse at the photosensor 203 in response to receiving the scintillating light, at block 403. The method can further include receiving the electronic pulse at the electronic module 205, at block 405. In an embodiment, the method can optionally include replicating the electronic pulse, at block 407, to allow different analysis to be conducted. The method can further include selecting a pulse processing technique to process and analyze the electronic pulse, at block 409. For instance, different techniques can be used to determine maximum emission wavelengths and decay times. The analysis can be performed in the processor 322, the FPGA 324, or both. In an embodiment, different analysis of replicates of the electronic pulse can be performed at the same time or sequentially. In a further embodiment, the method can further include retrieving known information of scintillator materials by the processor 322 from the memory 326 or another device. At block 411, the method can include comparing the electronic pulse to the known information. In an embodiment, the known information can be related to emission waveforms, decay times, maximum emission wavelengths or any combination thereof that correspond to individual scintillator materials, the combinations at different ratios, or both. The method can include determining the identity represented by the substrate 201, at block 413. In an embodiment, determining the identity can be based at least in part on a decay time, a maximum emission wavelength, or both of a scintillation material. For instance, if the decay times or the maximum emission wavelengths of the electronic pulse match the corresponding known information of the scintillator materials, the identity represented by the substrate can be verified. As used herein, the term, match, is intended to mean the detected values are within ±8% of the corresponding known values, such as within ±5%, within ±2% or within ±0.5% of the corresponding known values. In another instance, the identity can be confirmed when each of the decay times and maximum emission wavelengths of individual scintillator materials are verified. In a particular embodiment, when the emission waveforms of convoluted decay times and maximum emission wavelengths of the electronic pulse match corresponding known information of a combination of the scintillator materials at the predetermined ratio, the identity represented by the substrate is verified. In a particular embodiment, the identity is verified when the detected decay time and maximum emission wavelength are identical to the corresponding known information.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Embodiment 1

A substrate, comprising a first scintillator material and a second scintillator material that is different from the first scintillator material, wherein:
the first and second scintillator materials are present in the substrate at a predetermined ratio; and
the first and second scintillator materials have a decay time difference of at least 50% and a maximum emission wavelength difference of at least 25 nm when exposed to a same radiation source.

Embodiment 2

A substrate, comprising a first scintillator material and a second scintillator material that is different from the first scintillator material, wherein:
the first and second scintillator materials are present in the substrate at a predetermined ratio; and
each of the first and second scintillator materials has a decay time of at most 10 μs and a maximum emission wavelength difference of at least 25 nm when exposed to a same radiation source.

Embodiment 3

A system, comprising:
a substrate including a first scintillator material and a second scintillator material that is different from the first scintillator material, wherein:
the first and second scintillator materials are present in the substrate at a predetermined ratio; and
the first and second scintillator materials have a decay time difference of at least 50% and a maximum emission wavelength difference of at least 25 nm when exposed to a same radiation source; and
a logic element configured to determine an identity represented by the substrate based at least in part on a decay time, a maximum emission wavelength, or both.

Embodiment 4

A method, comprising:
generating an electronic pulse in response to a substrate being exposed to a radiation source;
analyzing the electronic pulse; and
determining an identity represented by the substrate, wherein determining the identity represented by the substrate comprises determining a composition of the substrate that includes at least two different scintillator materials that have a decay time difference of at least 50% and a maximum emission wavelength difference of at least 25 nm.

Embodiment 5

The method of Embodiment 4, wherein the radiation source emits an ultraviolet light.

Embodiment 6

The method of Embodiments 4 or 5, wherein analyzing the electronic pulse comprises obtaining a decay time, a maximum emission wavelength, or a combination thereof based on the electronic pulse.

Embodiment 7

The method of any of Embodiments 4 to 6, wherein analyzing the electronic pulse comprises performing pulse shape discrimination to obtain at least two different decay times.

Embodiment 8

The method of any of Embodiments 4 to 7, wherein analyzing the electronic pulse comprises performing wavelength spectral analysis to obtain at least two different maximum emission wavelengths.

Embodiment 9

The method of any of Embodiments 4 to 8, wherein analyzing the electronic pulse comprises obtaining a ratio between a first content of the first scintillator material and a second content of the second scintillator material.

Embodiment 10

The method of any of Embodiments 4 to 9, wherein determining the identity represented by the substrate further comprises determining the identity is true when the decay time, maximum emission wavelength, the ratio between the first content and second content, or a combination thereof matches a corresponding predetermined value.

Embodiment 11

The method of any of Embodiments 4 to 9, wherein determining the identity represented by the substrate further comprises determining the identity is not true when at least one of the decay time, maximum emission wavelength, and the ratio between the first content and second content does not match a corresponding predetermined value.

Embodiment 12

The method of any of Embodiments 5 to 11, wherein the ultraviolet light has a pulse time at most 500 ns.

Embodiment 13

The substrate, system, or method of any of Embodiments 1 to 12, wherein the substrate includes a fiber, a thread, a plastic film, an ink, or any combination thereof.

Embodiment 14

The substrate, system, or method of any of Embodiments 1 to 13, wherein each of the first and second scintillator materials has a decay time of at most 1 μs.

Embodiment 15

The substrate, system, or method of any of Embodiments 1 to 14, wherein at least one of the first and second scintillator materials has a decay time of at most 100 ns, or at most 10 ns, or at most 1 ns.

Embodiment 16

The substrate, system, or method of any of Embodiments 1 to 15, wherein at least one of the first and second scintillator materials comprises an inorganic compound.

Embodiment 17

The substrate, system, or method of any of Embodiments 1 to 16, wherein at least one of the first and second scintillator materials comprises an organic material.

Embodiment 18

The substrate, system, or method of any of Embodiments 1 to 17, wherein at least one of the first and second scintillator materials includes an organosilicon compound, an organo-metallic compound, or a triplet harvesting organic compound.

Embodiment 19

The substrate, system, or method of any of Embodiments 1 to 18, wherein at least one of the first and second scintillator materials comprises a chelate.

Embodiment 20

The substrate, system, or method of any of Embodiments 1 to 19, wherein at least one of the first and second scintillator materials comprises p-terphenyl ($C_{18}H_{14}$), 2,5-diphenyloxazole (PPO, $C_{15}H_{11}NO$), 1,1,4,4,-tetraphenylbutadiene (TBP, $C_{28}H_{22}$), 1,2,4-trimethyl benzene ($C_9H_{12}$), dimethyl stilbene (DPS, $C_{26}H_{18}$), bis-MSB ($C_{24}H_{22}$), dimethyl POPOP ($C_{26}H_{20}N_2O$), or tris [1-phenylisoquinolinato] iridum (III) ($C_{15}NIrH_{10}$).

Embodiment 21

The substrate, system, or method of any of Embodiments 1 to 20, wherein the first or the second scintillator material is not sensitive to a visible light.

Embodiment 22

The substrate, system, or method of any of Embodiments 1 to 20, wherein at least one of the first and the second scintillator materials is sensitive to a visible light.

Embodiment 23

The substrate, system, or method of any of Embodiments 1 to 22, wherein the substrate further comprises a third scintillator material that is different from the first and second scintillator materials.

Embodiment 24

The system of any of Embodiments 3 and 12 to 23, wherein the logic element includes a field programmable gate array, application-specific integrated circuit, a processor, or a combination thereof.

Embodiment 25

The system of any of Embodiments 3 and 12 to 24, further comprises an object including the substrate.

Embodiment 26

The system of Embodiment 25, wherein the object includes currency, medicine, clothing, a fabric, a bag, a purse, a liquor, a watch, a tobacco product, medical equipment, or food.

Embodiment 27

The substrate, system, or method of any of Embodiments 1 to 26, wherein at least one of the scintillator materials emits a scintillation light having a wavelength from 390 nm to 700 nm when exposed to the radiation source.

Embodiment 28

The substrate, system, or method of Embodiment 27, wherein the scintillation light forms a predetermined pattern.

The present embodiments represent a departure from the state of the art. The substrate of embodiments can be formed into a tag, a barcode, or otherwise embedded in, attached to, or imprinted on an object. The combination of scintillator materials is capable of producing a light pulse that can be turned into a subsequent electronic signature that is unique to a specific tagged object. The variable combinations of scintillator materials can be difficult for a counterfeiter to reproduce due to the complex interactions of scintillator materials (e.g., organic fluorescent molecules) and difficult to identify without esoteric equipment and knowledge.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A substrate, comprising a first scintillator material and a second scintillator material that is different from the first scintillator material, wherein:
    the first and second scintillator materials are present in the substrate at a predetermined ratio; and
    the first and second scintillator materials have a decay time difference of at least 50% and a maximum emission wavelength difference of at least 25 nm when exposed to a same radiation source,
    wherein at least one of the first and second scintillator materials comprises a chelate, an organosilicon compound, and organo-metallic compound, or a triplet harvesting organic compound.

2. The substrate of claim 1, wherein the substrate includes a fiber, a thread, a plastic film, an ink, or any combination thereof.

3. The substrate of claim 1, wherein each of the first and second scintillator materials has a decay time of at most 1 µs.

4. The substrate of claim 1, wherein at least one of the first and second scintillator materials has a decay time of at most 100 ns.

5. The substrate of claim 1, wherein at least one of the first and second scintillator materials comprises an inorganic compound.

6. The substrate of claim 1, wherein at least one of the first and second scintillator materials comprises an organic material.

7. The substrate of claim 1, wherein the first scintillator material is mixed with the second scintillator material.

8. The substrate of claim 1, wherein at least one of the first and second scintillator materials comprises p-terphenyl ($C_{18}H_{14}$), 2,5-diphenyloxazole (PPO, $C_{15}H_{11}NO$), 1,1,4,4,-tetraphenylbutadiene (TBP, $C_{28}H_{22}$), 1,2,4-trimethyl benzene ($C_9H_{12}$), dimethyl stilbene (DPS, $C_{26}H_{18}$), bis-MSB ($C_{24}H_{22}$), dimethyl POPOP ($C_{26}H_{20}N_2O$), K27 ($C_{26}H_{14}O_6N_6S_2Ru$), tris [1-phenylisoquinolinato] iridum (III) ($C_{15}NIrH_{10}$), or a combination thereof.

9. The substrate of claim 1, wherein the first or the second scintillator material is not sensitive to a visible light.

10. A system, comprising:
    the substrate of claim 1; and
    a logic element configured to determine an identity represented by the substrate based at least in part on a decay time, a maximum emission wavelength, or both.

11. The system of claim 10, wherein the logic element includes a field programmable gate array, application-specific integrated circuit, a processor, or a combination thereof.

12. A substrate, comprising a first scintillator material and a second scintillator material that is different from the first scintillator material, wherein:
    the first and second scintillator materials are present in the substrate at a predetermined ratio; and
    each of the first and second scintillator materials has a decay time of at most 10 µs and a maximum emission wavelength difference of at least 25 nm when exposed to a same radiation source, wherein at least one of the first and second scintillator materials comprises a chelate, an organosilicon compound, an organo-metallic compound, or a triplet harvesting organic compound.

13. The substrate of claim 12, wherein each of the first and second scintillator materials has a decay time of at most 100 ns.

14. The substrate of claim 12, wherein the organic material comprise p-terphenyl ($C_{18}H_{14}$), 2,5-diphenyloxazole (PPO, $C_{15}H_{11}NO$), 1,1,4,4,-tetraphenylbutadiene (TBP, $C_{28}H_{22}$), 1,2,4-trimethyl benzene ($C_9H_{12}$), dimethyl stilbene (DPS, $C_{26}H_{18}$), bis-MSB ($C_{24}H_{22}$), dimethyl POPOP ($C_{26}H_{20}N_2O$), K27 ($C_{26}H_{14}O_6N_6S_2Ru$), tris [1-phenylisoquinolinato] iridum (III) ($C_{15}NIrH_{10}$), or a combination thereof.

15. The substrate of claim 12, wherein at least one of the scintillator materials emits a scintillation light having a wavelength from 390 nm to 700 nm when exposed to the radiation source.

16. The substrate of claim 15, wherein the scintillation light forms a predetermined pattern.

17. The substrate of claim 12, wherein the substrate further comprises a third scintillator material that is different from the first and second scintillator materials.

18. A method, comprising: generating an electronic pulse in response to a substrate being exposed to a radiation source; analyzing the electronic pulse; and determining an identity represented by the substrate based on the electronic pulse, wherein determining the identity represented by the substrate comprises determining a composition of the substrate that includes at least two different scintillator materials that have a decay time difference of at least 50% and a maximum emission wavelength difference of at least 25 nm, wherein at least one of the at least two different scintillator materials comprises a chelate, an organosilicon compound, an organo-metallic compound, or a triplet harvesting organic compound.

19. The method of claim 18, wherein the radiation source emits an ultraviolet light having a pulse time of at most 500 ns.

20. The method of claim 18, wherein analyzing the electronic pulse comprises obtaining a decay time, a maximum emission wavelength, or a combination thereof based on the electronic pulse.

\* \* \* \* \*

UNITED STATES PATENT AND TRADEMARK OFFICE
CERTIFICATE OF CORRECTION

PATENT NO. : 11,054,530 B2
APPLICATION NO. : 16/196215
DATED : July 6, 2021
INVENTOR(S) : Peter R. Menge It is certified that error appears in the above-identified patent and that said Letters Patent is hereby corrected as shown below:

In the Claims

In Column 13, Lines 51-52, please delete "compound, and organo-metallic compound,", and insert --compound, an organo-metallic compound,--

Signed and Sealed this
Thirtieth Day of May, 2023

Katherine Kelly Vidal
*Director of the United States Patent and Trademark Office*